No. 666,579. Patented Jan. 22, 1901.
J. J. A. TRILLAT.
METHOD OF PRODUCING VAPORS OF FORMALDEHYDE.
(Application filed Dec. 29, 1897.)
(No Model.)
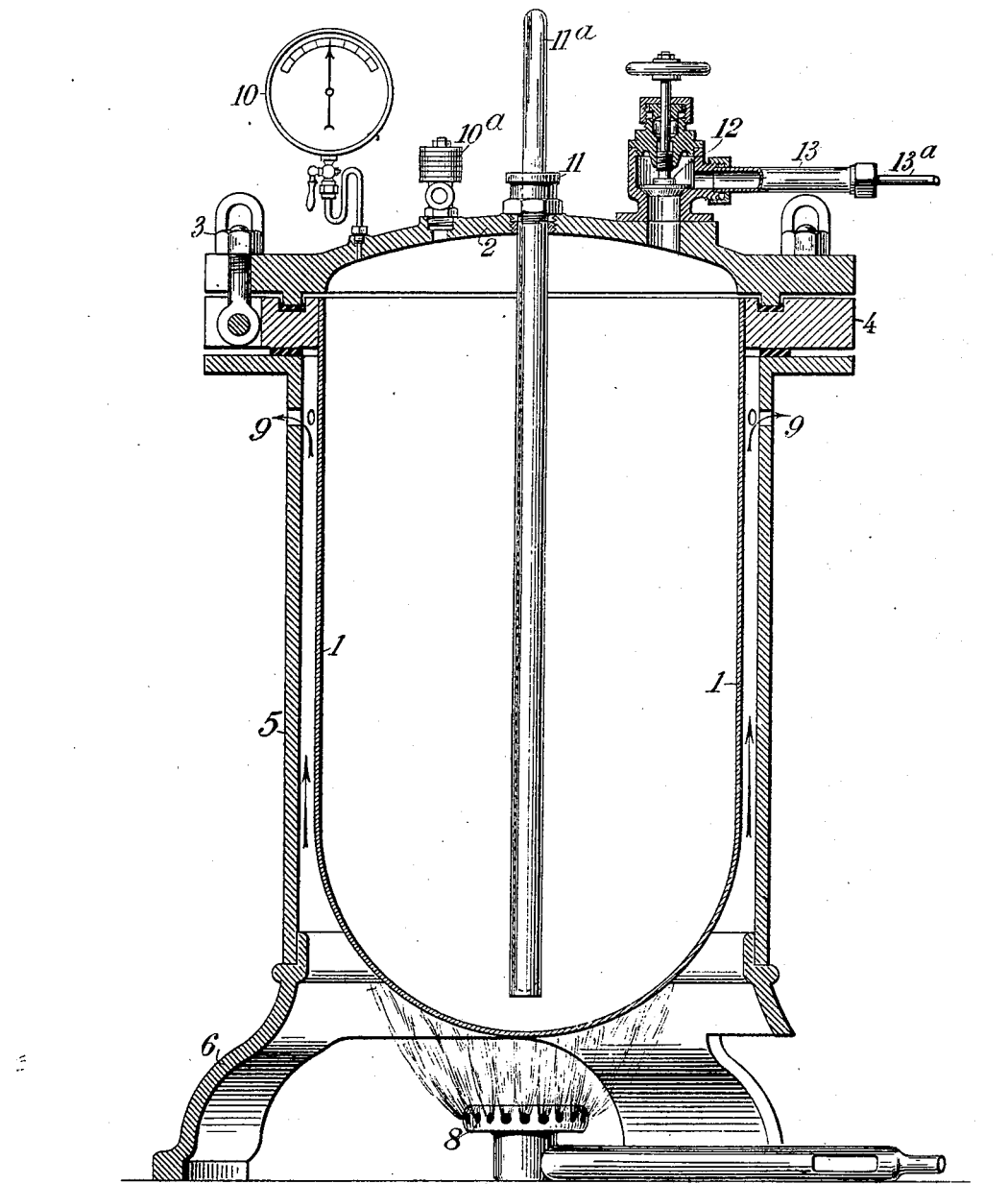
WITNESSES:
Fred White
Thomas F. Wallace
INVENTOR:
Jean Joseph Auguste Trillat,
By his Attorneys.

UNITED STATES PATENT OFFICE.

JEAN JOSEPH AUGUSTE TRILLAT, OF PARIS, FRANCE, ASSIGNOR TO LA SOCIÉTÉ CHIMIQUE DES USINES DU RHÔNE, ANCIENNEMENT GILLIARD, P. MONNET ET CARTIER, OF LYONS, FRANCE.

METHOD OF PRODUCING VAPORS OF FORMALDEHYDE.

SPECIFICATION forming part of Letters Patent No. 666,579, dated January 22, 1901.

Original application filed November 24, 1896, Serial No. 613,270. Divided and this application filed December 29, 1897. Serial No. 664,394. (No specimens.)

*To all whom it may concern:*

Be it known that I, JEAN JOSEPH AUGUSTE TRILLAT, a citizen of the Republic of France, and a resident of Paris, France, have invented certain new and useful Improvements in the Production of Vapors of Formic Aldehyde, of which the following is a specification.

This invention has been patented in France, No. 252,939, dated February 5, 1896, (certificat d'addition,) and No. 252,939, dated February 25, 1896, (certificat d'addition;) in Belgium, No. 122,120, dated June 24, 1896; in Austria, No. 46/3,175, dated August 12, 1896; in Brazil, No. 2,110, dated August 26, 1896; in Great Britain, No. 19,744, dated September 7, 1896; in Italy, No. 42,078, dated September 30, 1896; in Germany, No. 91,712, dated May 21, 1896; in Denmark, No. 1,176, dated July 1, 1896; in Spain, No. 19,289, dated July 1, 1896; in Hungary, No. 6,312, dated July 2, 1896; in Norway, No. 9,176, dated July 2, 1896; in Russia, No. 395, dated June 25 and July 7, 1896, and in the South African Republic, No. 1,244, dated November 4, 1896.

This invention relates to the production of vapors of formic aldehyde, and particularly for disinfecting purposes.

My present application is a division of my application for patent for production of formic aldehyde, filed November 24, 1896, Serial No. 613,270, (patented August 14, 1900, No. 656,061.) In my said application the process of producing formic aldehyde by subjecting a substance containing it to heat and pressure during the evolution of the formic-aldehyde vapors is claimed.

The feature to which my present application particularly pertains is the process of heating a substance containing formic aldehyde in connection with a soluble substance neutral thereto, as hereinafter set forth.

As stated in my aforesaid application, (Patent No. 656,061,) up to the time of my invention no means had been found for generating in an efficient manner the vapors of formic aldehyde from its commercial forty-per-cent. solution commonly known as "formalin" or "formol." The most simple process would evidently be to heat the solution in the open air, so as to drive off the vapors; but an insurmountable obstacle is met in the fact that polymerization takes place rapidly, and the solution is finally transformed into a solid substance, which, although more or less volatilizable at higher temperatures, only yields a variable quantity of non-polymerized formic-aldehyde vapors. This explains the want of success experienced up to the present in the application of formic aldehyde to the purposes of general disinfection.

In most sources of formic-aldehyde vapors there will be found both polymerized and unpolymerized formaldehyde, and the application of heat ordinarily will hasten polymerization. In aqueous solutions of formic aldehyde the aqueous vapors will sometimes be evolved with the gas. For practical disinfection the best advantages are obtainable with a non-polymerized and non-aqueous gas. My invention aims to attain a gas having both these advantageous conditions, to provide simple and effective means for producing such gas commercially, so that it can be readily generated and employed where required for disinfecting purposes, and to provide means for evolving practically all of the gas existing in the source of supply, preventing its polymerization and depolymerizing its polymers, so that the cost of disinfection with this gas is reduced by avoidance of the loss of a large proportion of the gas heretofore lost by polymerization and by discharging the gas in the best possible condition for disinfection.

To this end in carrying out the preferred form of my present improvements I provide an improved process of producing formic-aldehyde vapors from a source of such vapors— that is to say, from a substance containing formic aldehyde—such as a solution of formic aldehyde either in unpolymerized or polymerized form or a polymer of formic aldehyde or any composition of matter adapted to directly (*i. e.*, without synthetic treatment) evolve formic-aldehyde vapors.

In carrying out the preferred form of my improved mode or process I treat a source of formic-aldehyde vapors with a neutral or indifferent substance and evolve the formaldehyde vapors from the resulting product by means of heat either under little or no pressure, or, preferably, by subjecting it to both heat and pressure. The substance containing formaldehyde may be the commercial forty-per-cent. aqueous solution in which water is employed as the solvent for the formaldehyde gas. If this solution is employed, my invention provides for preventing evaporation of the solvent by dissolving in it a substance sufficing to elevate its boiling-point above the temperature requisite to drive off the formaldehyde vapors, whereby these vapors are obtained in a non-aqueous condition. The substance employed is a soluble neutral or indifferent substance, preferably a mineral substance, as a salt of an alkali or alkaline earth, sodium or calcium chlorid being preferred, and is preferably dissolved to saturation in a formic-aldehyde solution which it is required to vaporize. The substance is preferably neutral or indifferent in the sense that it is neither acid nor alkaline, as otherwise there is a liability of conversion of the formic aldehyde into formic acid, which is less advantageous as a disinfectant than formaldehyde. The addition of this salt or substance to the source of formaldehyde vapors facilitates the evolution of the vapors, prevents evaporation of the solvent when a solution is used, diminishes the tendency to polymerization, and depolymerizes existing polymers of formic aldehyde, so that the gases evolved come forth as unpolymerized and non-aqueous gases, being in the best condition for advantageous disinfection. When pressure is used, this may advantageously vary from two to six atmospheres, the pressure being obtained, if desired, by confining the source of formic-aldehyde vapors, evolving formaldehyde vapors from it by heat, and confining these vapors until the requisite pressure is obtained, whereupon by regulating their discharge or the degree of heat the temperature and pressure can be controlled.

It will be seen that my invention provides important improvements in the art of disinfection, making it commercially practicable to secure the great advantages of formic-aldehyde disinfection at slight cost and the minimum of inconvenience, where heretofore such disinfection has been too expensive and difficult to be generally employed, and that the invention has made it feasible to preserve and transport formic aldehyde without loss or deterioration, so that it can be kept in readiness for use and can be used at any time by any unskilled person without requiring employment of special apparatus.

The accompanying drawing represents a central vertical section showing the construction and arrangement of the digester which I find most suitable for treating my improved product according to my improved process when both heat and pressure are employed.

In the drawing, 1 is a strong flanged vessel of copper, provided with a strong removable gun-metal flanged cover 2, with india-rubber ring packing, adapted to be closed hermetically by means of hinged bolts 3. The vessel 1 rests, by means of its flange 4, inside an outer sheet-metal casing 5, which is supported on feet 6. A rose Bunsen burner 8 serves to heat the vessel 1, or a petroleum or alcohol lamp that permits of rapid heating may be employed. The hot gases of combustion pass up between the vessel 1 and the casing 5 and escape through holes 9. The apparatus is provided with a pressure-gage 10, a safety-valve $10^a$, a copper thermometer-tube casing 11, (in which may be inserted a thermometer $11^a$ with iron shield-casing,) and a screw-down stop-valve 12, all mounted on the cover 2. The screw-down valve is fitted with an outlet-pipe 13, to which may be adapted a flexible copper tube $13^a$ of small bore to allow the discharge of the formic-aldehyde vapors into a closed room or compartment which is to be disinfected through a small aperture, such as the keyhole of the door thereof, the autoclave itself being preferably situated outside the room or compartment.

In order to effect the generation of the formic-aldehyde vapor from the improved product the latter is placed in the digester and the pressure increased by heating to three or four atmospheres. At this point and without ceasing to apply heat the valve 12, which controls the escape-tube 13, is opened. The aldehyde gas is discharged into the room or compartment in the form of vapor pure and free from polymerization products. If the temperature and pressure are maintained sufficiently high, the complete transformation of the whole of the formic aldehyde in the autoclave into vapor is quickly obtained. Even when the heat is regulated to keep the pressure at, say, two atmospheres, the transformation may be effected, but the generation of the aldehyde vapors is necessarily more prolonged.

While in practicing my invention the proportions may be greatly varied, I find that for a liquid or solution the best results are obtained by dissolving calcium chlorid to saturation in a commercial or forty-per-cent. solution of formic aldehyde.

Any soluble or deliquescent salt will serve for carrying out my invention, provided only that it must have no reaction with formic aldehyde, being a salt neutral or indifferent thereto.

The product herein described is not in itself claimed in the present application, being claimed in two other applications which are also divisional of my said original application Serial No. 613,270, (Patent No. 656,061)—namely, Serial No. 724,965, filed July 24, 1899, and Serial No. 21,756, filed June 27, 1900.

What I claim is—

1. The improved process of producing formic-aldehyde vapors, which consists in heating a mixture of a substance containing formic aldehyde and a soluble neutral mineral salt in the presence of water, and in evolving the vapors from the resulting solution by heating the latter under pressure.

2. The improved process of producing non-aqueous formic-aldehyde vapors, which consists in dissolving a soluble substance in an aqueous solution of formic aldehyde and thereby raising the boiling-point of the water, subjecting the resulting product to a heat above the normal boiling-point of the water to evolve the formaldehyde vapors therefrom, and discharging such vapors.

3. The improved process of producing formic-aldehyde vapors, which consists in making a solution of a substance containing formic aldehyde and a soluble substance neutral thereto, said solution having a boiling-point higher than the temperature at which formic aldehyde is vaporized from solution, and heating said solution sufficiently to evolve formic-aldehyde vapors therefrom.

4. The improved process of producing formic-aldehyde vapors, which consists in making a solution of a substance containing formic aldehyde and a soluble neutral mineral salt, said solution having a boiling-point higher than the temperature at which formic aldehyde is vaporized from solution, and heating said solution sufficiently to evolve formic-aldehyde vapors therefrom.

5. The improved process of producing formic-aldehyde vapors, which consists in making a solution of a substance containing formic aldehyde and a soluble neutral salt of an alkali or alkaline earth, said solution having a boiling-point higher than the temperature at which formic aldehyde is vaporized from solution, and heating said solution sufficiently to evolve formic-aldehyde vapors therefrom.

6. The improved process of producing formic-aldehyde vapors, which consists in making a solution of a substance containing formic aldehyde and a soluble neutral chlorid salt, said solution having a boiling-point higher than the temperature at which formic aldehyde is vaporized from solution, and heating said solution sufficiently to evolve formic-aldehyde vapors therefrom.

In witness whereof I have hereunto signed my name in the presence of two subscribing witnesses.

JEAN JOSEPH AUGUSTE TRILLAT.

Witnesses:
   EDWARD P. MACLEAN,
   MARIE JOSEPH A. DUPREAS.